US 8,509,126 B2

(12) United States Patent
Diab et al.

(10) Patent No.: US 8,509,126 B2
(45) Date of Patent: Aug. 13, 2013

(54) METHOD AND SYSTEM FOR UTILIZING A RESERVED AND/OR OUT OF BAND CHANNEL FOR MAINTAINING A NETWORK CONNECTION

(75) Inventors: Wael William Diab, San Francisco, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 333 days.

(21) Appl. No.: 13/018,985

(22) Filed: Feb. 1, 2011

(65) Prior Publication Data

US 2011/0122956 A1 May 26, 2011

Related U.S. Application Data

(63) Continuation of application No. 12/107,434, filed on Apr. 22, 2008, now Pat. No. 7,881,331.

(60) Provisional application No. 60/979,433, filed on Oct. 12, 2007.

(51) Int. Cl.
*H04B 3/20* (2006.01)

(52) U.S. Cl.
USPC .......................................................... 370/292

(58) Field of Classification Search
USPC ................ 370/201, 282–292, 395.2; 455/24, 455/63.1–65, 135, 222–224, 278.1, 283–288, 455/296–312, 501–506; 379/417
See application file for complete search history.

(56) References Cited

U.S. PATENT DOCUMENTS

| 5,289,459 | A | * | 2/1994 | Brownlie ....................... 370/286 |
| 5,381,450 | A | | 1/1995 | Lane |
| 5,544,161 | A | | 8/1996 | Bigham et al. |
| 6,085,248 | A | | 7/2000 | Sambamurthy et al. |
| 6,147,972 | A | | 11/2000 | Onishi et al. |
| 6,192,422 | B1 | | 2/2001 | Daines |
| 6,201,796 | B1 | * | 3/2001 | Agazzi et al. ................. 370/286 |
| 6,442,174 | B1 | | 8/2002 | Lin |
| 6,587,473 | B2 | | 7/2003 | Terry et al. |
| 6,721,288 | B1 | | 4/2004 | King et al. |
| 6,731,692 | B1 | | 5/2004 | Bhoja |
| 6,738,358 | B2 | * | 5/2004 | Bist et al. ...................... 370/289 |
| 6,765,931 | B1 | | 7/2004 | Rabenko et al. |
| 6,795,450 | B1 | | 9/2004 | Mills et al. |
| 6,980,007 | B1 | | 12/2005 | Lo et al. |
| 7,418,050 | B1 | | 8/2008 | Gardner et al. |
| 7,457,252 | B2 | | 11/2008 | Karam et al. |
| 7,522,520 | B2 | | 4/2009 | Griggs |
| 7,529,274 | B2 | * | 5/2009 | Porter ........................... 455/502 |
| 2001/0033611 | A1 | | 10/2001 | Grimwood |
| 2002/0027985 | A1 | * | 3/2002 | Rashid-Farrokhi ........... 379/417 |

(Continued)

*Primary Examiner* — Jeffrey M Rutkowski
(74) *Attorney, Agent, or Firm* — Farjami & Farjami LLP (57) ABSTRACT

Aspects of a method and system for utilization of an reserved and/or out of band channel for maintaining a network connection are provided. In this regard, information relating to training of one or more link partners communicatively coupled to an Ethernet link may be exchanged via a reserved and/or out of band channel on the Ethernet link. The reserved and/or out of band channel may be an auxiliary channel as specified by the IEEE802.1AN standard. The reserved and/or out of band channel may be utilized for scheduling training of one or more of the link partners, determining which of the link partners require training, synchronizing training of the link partners, training the link partners based on changes in environmental conditions. The training may comprise configuring an echo canceller a far-end crosstalk canceller, and/or a near-end crosstalk canceller.

28 Claims, 6 Drawing Sheets

(56) References Cited

U.S. PATENT DOCUMENTS

| | | |
|---|---|---|
| 2002/0071160 A1 | 6/2002 | Pavelchek |
| 2002/0083116 A1 | 6/2002 | Petrini et al. |
| 2002/0136231 A1 | 9/2002 | Leatherbury |
| 2003/0053493 A1 | 3/2003 | Graham Mobley |
| 2003/0099208 A1* | 5/2003 | Graziano et al. ............ 370/286 |
| 2003/0191854 A1 | 10/2003 | Hsu |
| 2004/0181811 A1 | 9/2004 | Rakib |
| 2004/0213170 A1* | 10/2004 | Bremer ............... 370/282 |
| 2005/0254440 A1 | 11/2005 | Sorrell |
| 2006/0140218 A1 | 6/2006 | Winterton |
| 2006/0179152 A1 | 8/2006 | Baumer et al. |
| 2007/0025259 A1 | 2/2007 | Reinhold |
| 2007/0076722 A1* | 4/2007 | Ungerboeck et al. ...... 370/395.2 |
| 2007/0116036 A1 | 5/2007 | Moore |
| 2007/0127581 A1 | 6/2007 | Connor |
| 2007/0268811 A1* | 11/2007 | Clausen ................ 370/201 |
| 2007/0299906 A1 | 12/2007 | Bose et al. |
| 2008/0175197 A1 | 7/2008 | Shao et al. |
| 2008/0201626 A1 | 8/2008 | Sturm |
| 2008/0313508 A1 | 12/2008 | Starr |
| 2009/0097427 A1 | 4/2009 | Diab |
| 2009/0097442 A1 | 4/2009 | Diab |
| 2009/0097481 A1 | 4/2009 | Diab |
| 2009/0097500 A1 | 4/2009 | Diab |
| 2009/0154355 A1 | 6/2009 | Diab |
| 2009/0154455 A1 | 6/2009 | Diab |
| 2009/0154467 A1 | 6/2009 | Diab |
| 2009/0154490 A1 | 6/2009 | Diab |
| 2009/0154491 A1 | 6/2009 | Diab |
| 2009/0154500 A1 | 6/2009 | Diab |
| 2009/0154593 A1 | 6/2009 | Diab |

* cited by examiner

Training data over aux. channel

FIG. 4a

Training data over aux. channel

METHOD AND SYSTEM FOR UTILIZING A RESERVED AND/OR OUT OF BAND CHANNEL FOR MAINTAINING A NETWORK CONNECTION

CROSS-REFERENCE TO RELATED APPLICATIONS/INCORPORATION BY REFERENCE

This patent application is a continuation of U.S. patent application Ser. No. 12/107,434 filed on Apr. 22, 2008.

The above stated application is hereby incorporated herein by reference in its entirety.

FIELD OF THE INVENTION

Certain embodiments of the invention relate to a method and system for networking. More specifically, certain embodiments of the invention relate to a method and system for utilizing a reserved and/or out of band channel for maintaining a network connection.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a reserved and/or out of band channel for maintaining a network connection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a reserved and/or out of band channel for maintaining a network connection. In this regard, information relating to training of one or more link partners communicatively coupled to an Ethernet link may be exchanged via a reserved and/or out of band channel on the Ethernet link. The reserved and/or out of band channel may be an auxiliary channel as specified by the IEEE802.1AN standard. The reserved and/or out of band channel may be utilized for scheduling training of one or more of the link partners, determining which of the link partners require training, synchronizing training of the link partners, training the link partners based on changes in environmental conditions. The training may comprise configuring an echo canceller a far-end crosstalk canceller, and/or a near-end crosstalk canceller.

Figure 1:
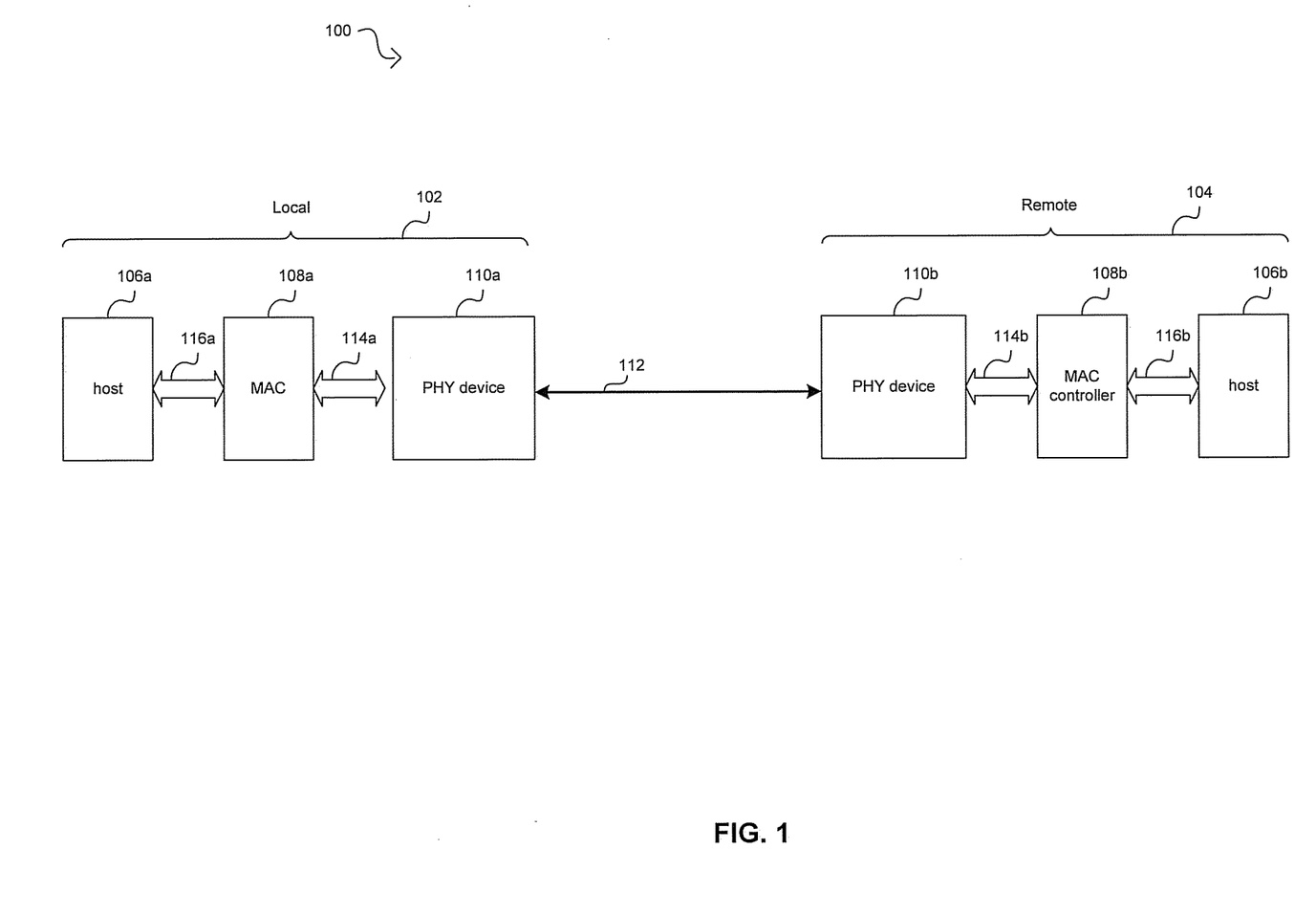
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more physical channels, each of which may, for example, comprise an unshielded twisted pair (UTP). The local link partner 102 and the remote link partner 104 may communicate via two or more physical channels in the cable 112. For example, Ethernet over twisted pair standards 10BASE-T and 100BASE-TX may utilize two pairs of UTP while Ethernet over twisted pair standards 1000BASE-T and 10 GBASE-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In an exemplary embodiment of the invention, the link partners 102 and/or 104 may comprise an optical PHY capable of operating at one or more standard rates such as 10

Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data rate in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In this regard, the link partners 102 and 104 may control an uplink data rate independent of a downlink data rate and data rate transitions may occur asymmetrically.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary MIIs may comprise gigabit MII (GMII), 10 Gigabit MII (XGMII), Serial Gigabit MII (SGMII), and Reduced Gigabit MII (RGMII).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, a data rate of the link 112 may be controlled to communicate in a more energy efficient manner. In this regard, a low(er) data rate on the link 112 may enable reducing power consumed on the link 112 and in the link partners 102 and 104. The data rate may be controlled by, for example, controlling a number of physical channels utilized to communicate data, controlling the pulse amplitude modulation (PAM) levels used for signaling, controlling the signal constellation utilized for representing data on the link, and/or controlling the length of time between frames (the inter-frame gap). In this regard, one or more methods may be utilized on a link to achieve a maximum data rate, a zero data rate, or one or more intermediate data rates. In an exemplary embodiment of the invention, one or more channels of the link 112 may transmit data in bursts in between periods of inactivity. For these burst transmissions, energy efficiency of the network 100 may be improved by reducing the power required for keeping the channels trained. In this regard, power may be reduced in comparison to a conventional network which may continuously transmit conventional IDLE symbols. Additionally, if transmitting in bursts in between periods of inactivity, communication over a reserved and/or out of band channel may be utilized to coordinate training and/or the exchange of training related information prior to the link going into an inactive state.

In operation, when the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters and/or circuitry to account for variables such as the type of cabling over which data is being communicated and the environmental conditions (e.g. temperature) surrounding the cabling. This process of configuring one or more circuits and/or parameters in an Ethernet link partner coupled to a physical channel may be referred to as "training. In this regard, "training" may adapt a link partner to current link conditions such that reliable communications may be established on a link. For example, training may comprise configuring various parameters, circuitry, and or timing loops in one or both of the nodes 102 and 104 such that the nodes 102 and 104 may be synchronized and/or reliably communicate over one or more physical channels of the cable 112. In this manner, training may ensure reliable operation of functions such as echo cancellation, far-end crosstalk cancellation, and near-end crosstalk cancellation may be performed.

Training parameters and/or circuitry may need to be periodically refreshed or updated to adapt a link partner to varying conditions on the Ethernet link or medium. In a conventional network, a link partner coupled to a physical channel which has been inactive for a period of time may need to be "retrained" such that circuitry and/or parameters, which may become outdated over time, may be refreshed in order to provide reliable communications over the physical channel (s). However, a complete retraining of a link partner may be a length operation which may interfere with communications on the link. Accordingly, aspects of the invention may enable periodically verifying and/or updating configuration parameters and/or other training information such that a complete retraining may be unnecessary. Coordinating verification and/or update of circuitry and/or parameters in a link partner may be challenging in instances that the link partner may be actively communicating data. In this regard, communications may need to be interrupted while training is coordinated and/or while training information, such as configuration parameters, is exchanged between link partners. Accordingly, aspects of the invention may enable utilizing a reserved and/or out of band channel to coordinate and/or schedule training of a link partner and/or exchange training information without having a significant negative impact on communications between the link partners.

Figure 2:
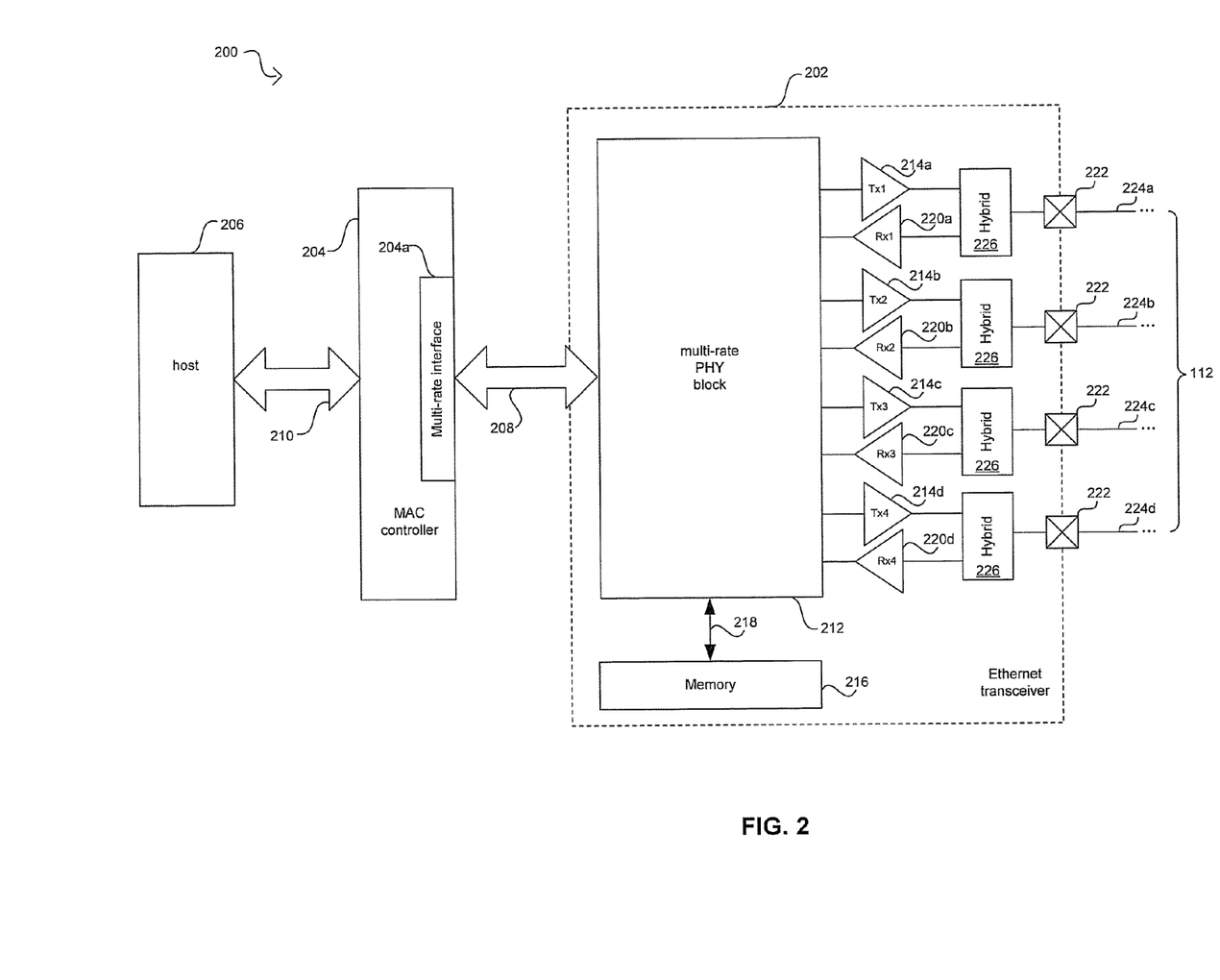
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote link partner. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10 GBASE-T, and other similar protocols that utilize multiple physical channels between link partners. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214*a*, 214*b*, 214*c*, 214*d* may comprise suitable logic, circuitry, and/or code that may enable transmission of data from the link partner 200 to a remote link partner via, for example, the cable 112 in FIG. 1. The receivers 220*a*, 220*b*, 220*c*, 220*d* may comprise suitable logic, circuitry, and/or code that may enable receiving data from a remote link partner. Each of the transmitters 214*a*, 214*b*, 214*c*, 214*d* and receivers 220*a*, 220*b*, 220*c*, 220*d* in the PHY device 202 may correspond to a physical channel that may comprise the cable 112. In this manner, a transmitter/receiver pair may interface with each of the physical channels 224*a*, 224*b*, 224*c*, 224*d*. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the local link partner 300 may be communicatively coupled to an input/output interface 222.

Due to the complex nature of the signal processing involved with full-duplex communication at high data rates, various components of the link partner 200 may be "trained" in order to provide reliable communications with a remote link partner. For example, the echo cancellers, far-end crosstalk (FEXT) cancellers, and/or near-end crosstalk (NEXT) cancellers may comprise one or more configuration parameters which may be determined based on factors comprising environmental conditions, distance to the remote link partner, and data rate. Accordingly, these configuration parameters may need to be configured upon establishing a connection to a remote link partner. In link partners and/or circuitry associated with a channel which may be actively communicating information, configuration parameters associated with that channel may be continuously updated. However, in link partners and/or circuitry communicatively coupled to an inactive channel, configuration parameters associated with that channel may occasionally need to be verified and/or refreshed. Similarly, a channel may be active but circuitry associated with that channel may be in a low(er) power state and configuration parameters and/or other information associated with that circuitry may need to be periodically verified and/or updated. In this regard, occasionally verifying and/or updating configuration parameters and/or other training information may reduce how often the link partners need to be trained. This may be advantageous because a full training session may require more time and/or power than an occasional verification and/or update of training related information.

Thus, aspects of the invention may enable the link partner 200 to utilize a reserved and/or out of band channel on the link 112 to exchange training related information with a remote link partner. In an exemplary embodiment of the invention, communications on the link 112 may adhere to 10 GBASE-T standards and a reserved and/or out of band channel may comprise an auxiliary channel as described in clause 55 of the IEEE 802.3AN standard. In other various embodiments of the invention, a reserved and/or out of band channel may be established during data rate transitions on the link. For example, when transitioning to a new data rate, the new data rate may be higher than a necessary data rate by an amount equal to (or slightly greater to provide some headroom) the reserved and/or out of band channel. Information exchanged over the reserved and/or out of band channel may comprise configuration parameters, information for synchronizing training in multiple link partners, information as to the state of the link, information for coordinating which circuitry and/or parameters in which link partners may need training, and information for coordinating when to train a link partner.

Figure 3:
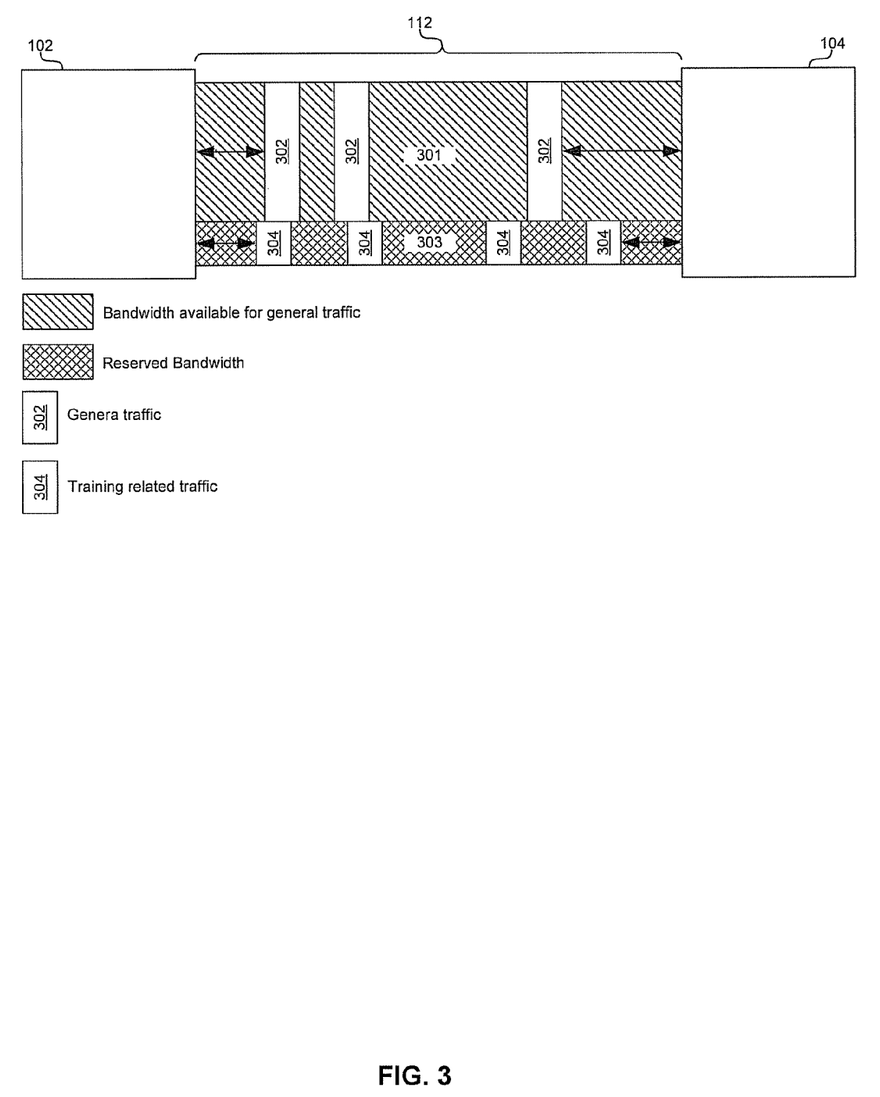
FIG. 3 is a diagram illustrating the utilization of a reserved and/or out of band channel for maintaining a network connection, in accordance with an embodiment of the invention.

FIG. 3 is a diagram illustrating the utilization of a reserved and/or out of band channel for maintaining a network connection, in accordance with an embodiment of the invention. Referring to FIG. 3, there is shown link partners 102 and 104 which may communicate via the cable 112. The cable 112 may, for example, comprise one or more twisted pairs as described in FIG. 1. In other exemplary embodiments of the invention, the cable 112 may comprise a fiber optic cable or a backplane.

The link 112 may support a total bandwidth comprised of the portions 301 and 303. In this regard, the bandwidth 301 may be utilized for communicating Ethernet frames carrying general Ethernet traffic. The bandwidth 303 may comprise a reserved and/or out of band channel. In an exemplary embodiment of the invention, the reserved and/or out of band channel may be as allocated in the IEEE 802.3AN standard, as described below in FIG. 5. In various other embodiments of the invention, the reserved and/or out of band channel 303 may comprise bandwidth allocated during a data rate transition. For example, the reserved and/or out of band channel 303 may be a fixed amount of bandwidth in addition to the bandwidth 301. For another example, the reserved and/or out of band channel 303 may be a fixed percentage of the bandwidth 301. In an exemplary embodiment of the invention, a reserved and/or out of band channel may be utilized to coordinate a portion of data rate transitions and another method may be utilized to coordinate a portion of data rate transitions.

Aspects of the invention may enable utilizing the reserved and/or out of band channel 304 for maintaining a network connection between the link partners 102 and 104 such that the link partners 102 and 104 may reliably communicate over one or more physical channels in the link 112. By utilizing the 303 portion of the bandwidth for exchanging training related information, the 301 portion of the bandwidth may provide uninterrupted data communications between the link partners 102 and 104. In this regard, the training related traffic 304 communicated over the reserved and/or out of band channel 303 may comprise information utilized to determine when to train a link partner (including synchronizing training in multiple link partners) and/or information indicating which circuitry and/or parameters need training. Additionally, the training data and/or coordination traffic 304 may comprise state information and/or configuration parameters for verifying and/or updating state variables and/or circuitry in the link partner 102 and/or 104.

Figure 4A:
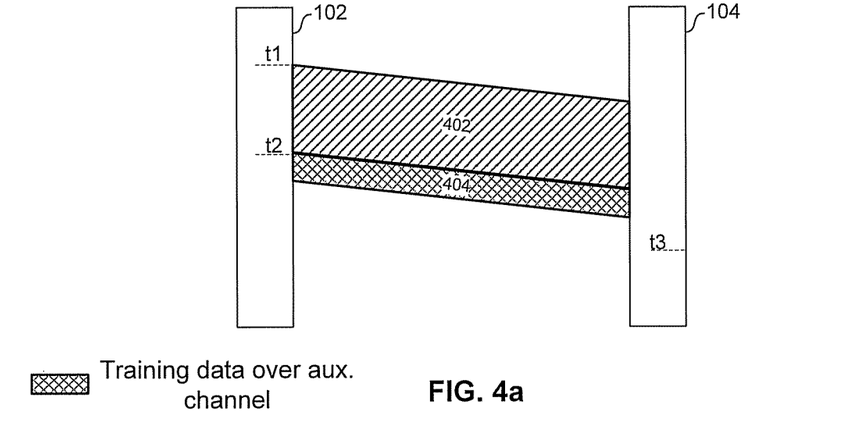
FIGS. 4A and 4B illustrate some advantages of utilizing a reserved and/or out of band channel for maintaining a network connection, in accordance with an embodiment of the invention.
Figure 4B:
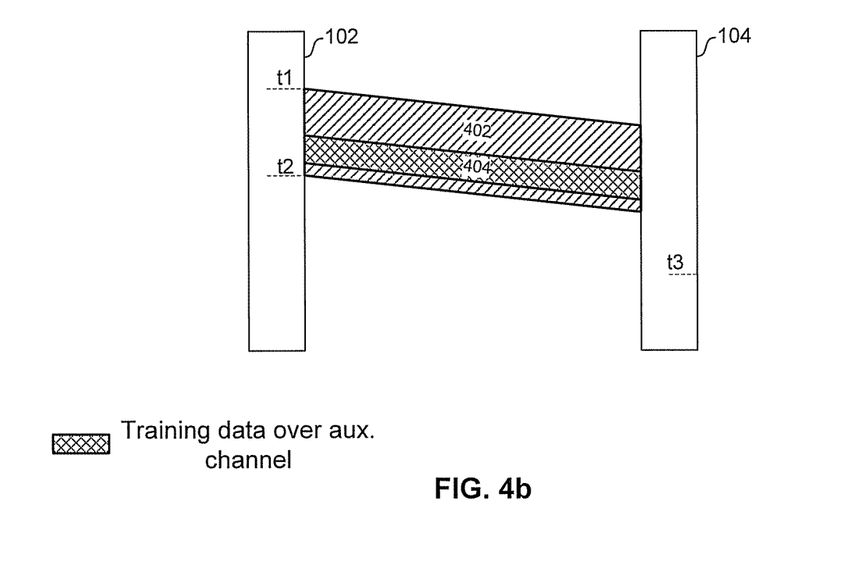

FIGS. 4A and 4B illustrate some advantages of utilizing a reserved and/or out of band channel for maintaining a network connection, in accordance with an embodiment of the invention. Referring to FIGS. 4A and 4B, there is shown an exemplary communication between link partners 102 and 104.

At time instant t1, link partner 102 may begin transmission of block of general Ethernet data 402. For example, the block 402 may comprise a frame received by a physical layer device from a MAC controller just prior to time instant t1. Shortly after time t1, link partner 102 may wish to communicate some training related information to the link partner 104. However, as depicted in FIG. 4A, without a reserved and/or out of band channel for communicating training related information, the link partner may have to wait until transmission of block 402 completes at time t2 before the information may be exchanged. This delay in exchanging training related information may result in data communicated over one or more physical channels on the link 112 becoming unreliable and/or experiencing increased error rates. For example, a delay in communicating configuration parameters and/or other training related information may result in that information becoming outdated before a link partner may be able to even utilize it.

Without a reserved and/or out of band channel for exchanging training information, the only alternatively may be for the link partner 102 to interrupt transmission of 402 to send 404. However, interrupting data on the link to exchange training related information may be less than ideal as it may negatively impact the data 402 and/or a user's experience with the data 402. Moreover, interrupting transmission of 402 may require physical layer buffering which may significantly increase cost and/or complexity of a physical layer device.

Conversely, as depicted in FIG. 4B, if a reserved and/or out of band channel is utilized for exchanging training related information, then the block 404 may be transmitted in parallel with the block 402. In this manner, the general Ethernet traffic may be unaffected by training of the link partner 102 and/or 104.

Figure 5:
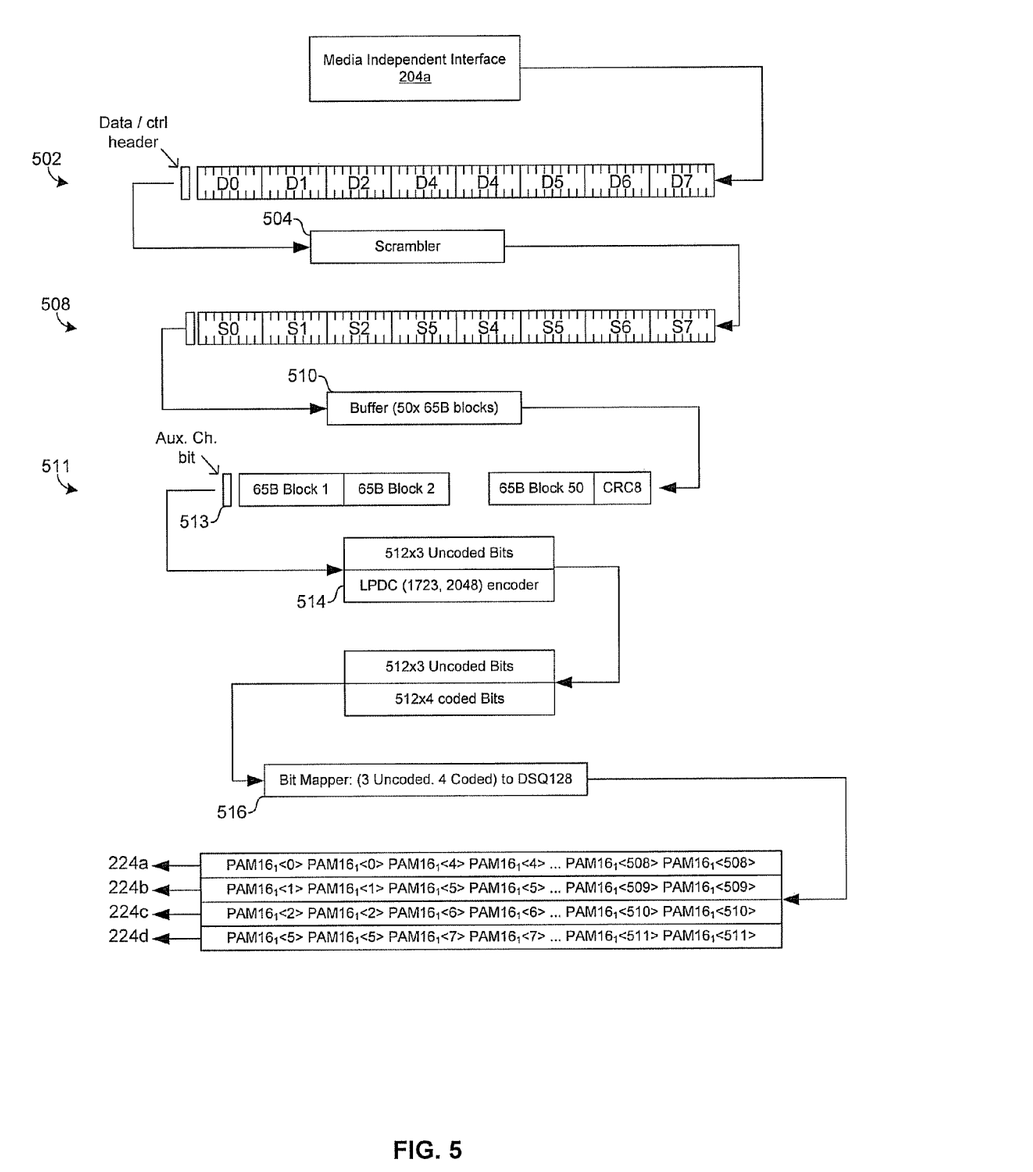
FIG. 5 is a diagram illustrating an exemplary reserved and/or out of band channel in 10 GBASE-T Ethernet, in accordance with an embodiment of the invention.

FIG. 5 is a diagram illustrating an exemplary reserved and/or out of band channel in 10 GBASE-T Ethernet, in accordance with an embodiment of the invention. Referring to FIG. 5, 10GBASE-T Ethernet communications may begin when 64 bits of data are transferred via the media independent interface 204a to the Ethernet transceiver 202. Next, a 1-bit data/control header may be prepended to the 64 bit block to generate a 65 bit block 502. The 65 bit block 502 may be passed through a scrambler 504 resulting in the scrambled 65 bit block 508. A buffer 510 may aggregate 50 of the scrambled 65 bit blocks 508. An 8-bit cyclic redundancy check (CRC8) may be appended to the 50 65-bit blocks and 1-bit of auxiliary data 513 may be prepended to the 50 65-but blocks, resulting in a 3259-bit frame 511. The frame 511 may pass through a low density parity check (LDPC) encoder 514 resulting in 512 7-bit labels where each of the 512 labels comprises 3 uncoded bits and 4 coded bits. The 7-bit labels may then pass through a bit mapper 516 which maps the labels into 512 2D symbols selected from a DSQ128 constellation. The 512 DSQ128 symbols are then transmitted over the 4 physical channels 224a-224d (FIG. 2) in the form of 256 constituent PAM16 symbols per physical channel. Additional details regarding data transmission in a 10 GBASE-T system may be found in the applicable standards documents.

Aspects of the invention may enable the auxiliary bit 513 to be utilized for exchanging training related information in the 10 GBASE-T network. In this regard, a conventional 10 GBASE-T network may transmit 800Msymbols per second on each physical channel. Accordingly, a data rate of the auxiliary channel may be calculated as shown in EQ. 1.

$$\frac{1 \text{ auxiliary bit}}{256 \text{ symbols}} \cdot \frac{800M \text{ symbols}}{\text{sec}} = \frac{3.125M \text{ } aux \text{ bits}}{\text{sec}} \qquad \text{EQ. 1}$$

Thus, the 10 GBASE-T standard reserves an auxiliary channel of 3.125 Mbps. Accordingly, this auxiliary channel may be utilized for exchanging training related information.

Figure 6:
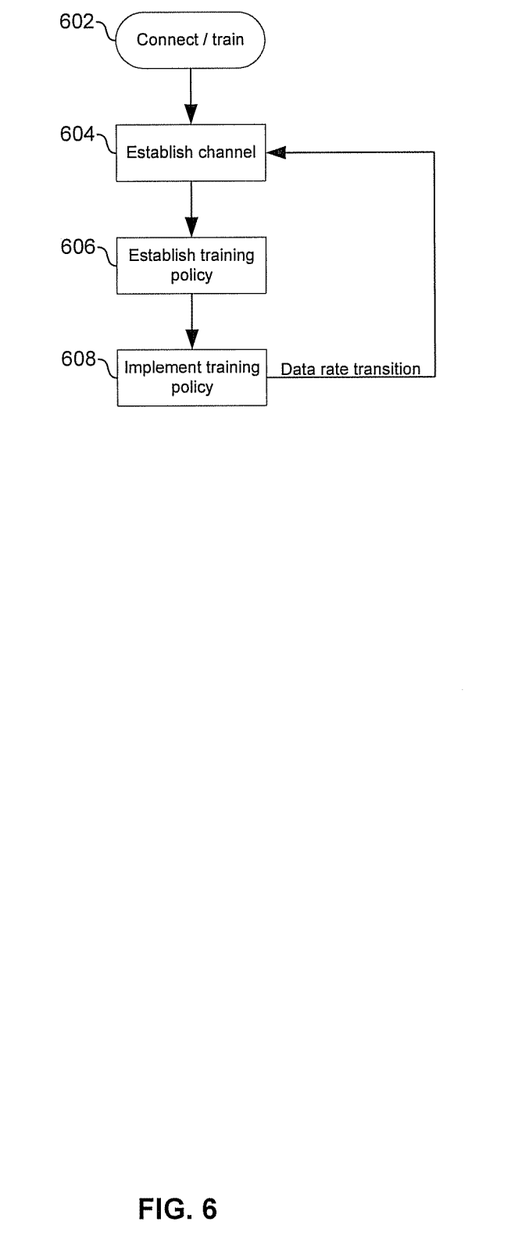
FIG. 6 is a flowchart illustrating exemplary steps for exchanging training related information over a reserved and/or out of band channel, in accordance with an embodiment of the invention.

FIG. 6 is a flowchart illustrating exemplary steps for exchanging training related information over a reserved and/or out of band channel, in accordance with an embodiment of the invention. The exemplary steps may begin with step 602. In step 602, a network connection may be established between two link partners communicatively coupled via a link comprising one or more physical channels. In this regard, the link partners may each undergo a training routine such that they may adapt to the physical channel(s). Subsequent to step 602, the exemplary steps may advance to step 604. In step 604, the link partners may establish a reserved and/or out of band channel over which training related information may be exchanged. Subsequent to step 604, the exemplary steps may advance to step 606. In step 606, a training policy may be established to maintain the connection between the two link partners. In this regard, the control policy may, for example, determine which information may be exchanged over the reserved and/or out of band channel and/or determine when to exchange information over the reserved and/or out of band channel. Subsequent to step 606, the exemplary steps may advance to step 608. In step 608, the training policy may be adhered to in maintaining reliable communications on the link. In this regard, activities such as exchanging information pertaining to over the reserved and/or out of band channel may occur as indicated by the training policy. In the event of a data rate transition on the link, the exemplary steps may return to step 604. In this regard, a new reserved and/or out of band channel may be established before or after increases or decreases in data rate.

Aspects of a method and system for utilization of an reserved and/or out of band channel for maintaining a network connection are provided. In this regard, information relating to training of one or more link partners, such as the partners 102 and 104, communicatively coupled to an Ethernet link, such as the link 112, may be exchanged via reserved and/or out of band channel, such as the bandwidth 303, on the Ethernet link. The reserved and/or out of band channel may be an auxiliary channel as provided for in the IEEE802.1AN standard. The reserved and/or out of band channel may be utilized for scheduling training of one or more of the link partners, determining which of the link partners require training, synchronizing training of the link partners, training the link partners based on changes in environmental conditions.

The training may comprise configuring an echo canceller a far-end crosstalk canceller, and/or a near-end crosstalk canceller.

Another embodiment of the invention may provide a machine-readable storage, having stored thereon, a computer program having at least one code section executable by a machine, thereby causing the machine to perform the steps as described herein for utilizing a reserved and/or out of band channel for maintaining a network connection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   detecting, in a first network device, that conditions on a network link are varying, wherein:
      said first network device transmits frames to a second network device via said network link; and
      one or more bits of each of said frames are reserved for communicating training-related parameters, wherein how many bits of each of said frames are reserved as said one or more bits is determined based on a data rate on said network link; and
   in response to said detecting that said conditions are varying, transmitting one or more training-related parameters to said second network device utilizing said one or more reserved bits of said frames.

2. The method according to claim 1, wherein said varying conditions comprise environmental conditions.

3. The method according to claim 1, wherein said varying conditions comprise a varying data rate on said network link.

4. The method according to claim 1, wherein said training-related parameters are for configuring an echo canceller.

5. The method according to claim 1, wherein said training-related parameters are for configuring a far-end crosstalk canceller.

6. The method according to claim 1, wherein said training-related parameters are for configuring a near-end crosstalk canceller.

7. The method according to claim 1, wherein said training-related parameters convey information about a state of said first network device.

8. The method according to claim 1, wherein said training-related parameters convey information about a state of said network link.

9. The method according to claim 1, wherein how many bits of said frames are reserved as said one or more bits changes along with changes in said data rate on said network link.

10. The method according to claim 1, wherein said network link is an Ethernet link.

11. A system comprising:
   one or more circuits for use in a first network device, said first network device being coupled to a second network device via a network link, and said one or more circuits being operable to:
      detect that conditions on said network link are varying, wherein:
         said first network device transmits frames to a second network device via said network link; and
         one or more bits of each of said frames are reserved for communicating training-related parameters, wherein how many bits of each of said frames are reserved as said one or more bits is determined based on a data rate on said network link; and
      in response to said detecting that said conditions are varying, transmit one or more training-related parameters to said second network device utilizing said one or more reserved bits of said frames.

12. The system according to claim 11, wherein said varying conditions comprise environmental conditions.

13. The system according to claim 11, wherein said varying conditions comprise a varying data rate on said network link.

14. The system according to claim 11, wherein said training-related parameters are for configuring an echo canceller.

15. The system according to claim 11, wherein said training-related parameters are for configuring a far-end crosstalk canceller.

16. The system according to claim 11, wherein said training-related parameters are for configuring a near-end crosstalk canceller.

17. The system according to claim 11, wherein said training-related parameters convey information about a state of said first network device.

18. The system according to claim 11, wherein said training-related parameters convey information about a state of said network link.

19. The system according to claim 11, wherein how many bits of said frames are reserved as said one or more bits changes along with changes in said data rate on said network link.

20. The system according to claim 11, wherein said network link is an Ethernet link.

21. A system comprising:
   one or more circuits for use in a first network device, said first network device being coupled to a second network device via a network link, and said one or more circuits being operable to:
      detect that conditions on said network link are varying, wherein:
         said first network device transmits groups of symbols to a second network device via said network link;

one or more bits of each of said groups of symbols are reserved for communicating training-related parameters, wherein how many bits of each of said groups of symbols are reserved as said one or more bits is determined based on a data rate on said network link; and in response to said detection of said varying conditions, transmitting one or more training-related parameters to said second network device utilizing said one or more reserved bits.

22. The system according to claim 21, wherein said varying conditions comprise environmental conditions.

23. The system according to claim 21, wherein said varying conditions comprise a varying data rate on said network link.

24. The system according to claim 21, wherein said training-related parameters are for configuring an echo canceller.

25. The system according to claim 21, wherein said training-related parameters are for configuring a crosstalk canceller.

26. The system according to claim 21, wherein said training-related parameters convey information about one or both of a state of said first network device and a state of said network link.

27. The system according to claim 21, wherein how many bits of said groups of symbols are reserved as said one or more bits changes along with changes in said data rate on said network link.

28. The system according to claim 21, wherein said network link is an Ethernet link.

* * * * *